US00RE44666E

(19) United States
(12) Reissued Patent
Cai

(10) Patent Number: US RE44,666 E
(45) Date of Reissued Patent: Dec. 24, 2013

(54) APPARATUS, AND ASSOCIATED METHOD, FOR PROVIDING OPEN LOOP DIVERSITY IN A RADIO COMMUNICATION SYSTEM

(75) Inventor: Zhijun Cai, Irving, TX (US)

(73) Assignee: BlackBerry Limited, Waterloo, Ontario (CA)

(21) Appl. No.: 13/592,192

(22) Filed: Aug. 22, 2012

Related U.S. Patent Documents

Reissue of:
(64) Patent No.: 7,860,465
Issued: Dec. 28, 2010
Appl. No.: 11/742,713
Filed: May 1, 2007

U.S. Applications:
(63) Continuation of application No. 13/314,808, filed on Dec. 8, 2011, now Pat. No. Re. 44,021.

(51) Int. Cl.
*H04B 1/02* (2006.01)

(52) U.S. Cl.
USPC ..... 455/101; 455/102; 455/103; 375/267; 370/334

(58) Field of Classification Search
USPC ..... 370/208, 210, 211, 328, 334; 375/260, 375/261, 267, 269, 272, 273, 279; 455/101, 455/102, 103
See application file for complete search history.

(56) References Cited

U.S. PATENT DOCUMENTS

| | | | |
|---|---|---|---|
| 7,184,488 | B2 | 2/2007 | Papadias et al. |
| 2003/0022634 | A1 | 1/2003 | Benning et al. |
| 2003/0022635 | A1 | 1/2003 | Benning et al. |
| 2003/0022641 | A1 | 1/2003 | Benning et al. |
| 2003/0039205 | A1 | 2/2003 | Chiodini |
| 2003/0108087 | A1 | 6/2003 | Shperling et al. |
| 2003/0109282 | A1 | 6/2003 | Shperling et al. |
| 2003/0174782 | A1 | 9/2003 | Papadias et al. |
| 2004/0052315 | A1 | 3/2004 | Thielecke et al. |
| 2005/0141644 | A1* | 6/2005 | Sadowsky ..... 375/324 |

(Continued)

FOREIGN PATENT DOCUMENTS

| | | |
|---|---|---|
| CN | 1579054 A | 2/2005 |
| JP | 2005-318309 | 11/2005 |

(Continued)

OTHER PUBLICATIONS

Dabak, A.G. et al.; "A Comparison of the Open Loop Transmit Diversity Schemes for Third Generation Wireless Systems"; IEEE Wireless Communications and Networking Conference 2000; vol. 1; Sep. 23, 2000; pp. 437-442.

(Continued)

*Primary Examiner* — Cong Tran
(74) *Attorney, Agent, or Firm* — Fish & Richardson P.C.

(57) ABSTRACT

Apparatus, and an associated method, for providing transmit diversity to an open-loop MIMO communication scheme, such as a point to multipoint broadcast service in a cellular system. Multiple data streams of the broadcast data are broadcast by way of transmit diversity antennas of a sending station. The data symbols of the separate data streams are phase-shifted to be offset in phase from one another. The data streams, once the data symbols thereof are selectably phase-shifted by a phase shifter, are applied by an applier to sending nodes of the respective cells.

6 Claims, 5 Drawing Sheets

(56) References Cited

U.S. PATENT DOCUMENTS

| | | | |
|---|---|---|---|
| 2005/0255805 | A1 | 11/2005 | Hottinen |
| 2005/0286665 | A1 | 12/2005 | Resheff et al. |
| 2006/0077886 | A1 | 4/2006 | Oh et al. |
| 2006/0087960 | A1 | 4/2006 | Kim et al. |
| 2006/0172710 | A1 | 8/2006 | Cahana et al. |
| 2007/0041466 | A1 | 2/2007 | Chiurtu et al. |
| 2007/0211815 | A1 | 9/2007 | Pan et al. |
| 2008/0080454 | A1 | 4/2008 | Rofougaran |
| 2010/0020893 | A1 | 1/2010 | Hoshino et al. |

FOREIGN PATENT DOCUMENTS

| | | |
|---|---|---|
| JP | 2006-511167 | 3/2006 |
| JP | 2006-129475 | 5/2006 |
| JP | 2007-013345 | 1/2007 |
| JP | 2007-510329 | 4/2007 |
| JP | 2008-552072 | 4/2013 |
| WO | 2006063138 | 6/2006 |
| WO | 2007/037151 | 4/2007 |

OTHER PUBLICATIONS

Tan, Jun et al.; "Multicarrier Delay Diversity Modulation for MIMO Systems"; IEEE Transactions on Wireless Communications; vol. 3, Issue 5; Sep. 2004; pp. 1756-1763.
Office Action issued in U.S. Appl. No. 11/742,713 on Apr. 13, 2010; 9 pages.
Notice of Allowance issued in U.S. Appl. No. 11/742,713 on Sep. 13, 2010; 4 pages.
Extended European Search Report issued in European Application No. 07108970.0 on Oct. 30, 2007; 6 pages.
Communication Pursuant to Article 94(3) EPC issued in European Application No. 07108970.0 on Jun. 6, 2008; 7 pages.
Communication under Rule 71(3) PEC issued in European Application No. 07108970.0 on May 26, 2010; 29 pages.
Extended European Search Report issued in European Application No. 10184476.9 on Mar. 9, 2011; 5 pages.
Communication Pursuant to Article 94(3) EPC issued in European Application No. 10184476.9 on Dec. 8, 2011; 5 pages.
Office Action issued in Japanese Application No. 2010-504400 on Jan. 6, 2012; 8 pages.
International Search Report and Written Opinion of the International Searching Authority issued in International Application No. PCT/CA2008/000765 on Aug. 7, 2008; 9 pages.
International Preliminary Report on Patentability issued in International Application No. PCT/CA2008/000765 on Jul. 13, 2009; 10 pages.
Office Action issued in Chinese Application No. 200880022860.8 on May 3, 2012; 13 pages.
Final Office Action issued in Japanese Application No. 2010-504400 on Jun. 12, 2012; 5 pages.
Office Action issued in Canadian Application No. 2,686,717 on Sep. 11, 2012; 4 pages.
Office Action issued in U.S. Appl. No. 13/314,808 on May 21, 2012; 7 pages.
Huawei; Comparison of Downlink Transmit Diversity Schemes with Inter-Cell Interference [omline], 3GPP TSG-RAN WG1#46; R1-062135, Aug. 28-Sep. 1, 2006.
Office Action issued in Japanese Application No. 2012-087239 on Jun. 18, 2013; 8 pages.
Office Action issued in Chinese Application No. 200880022860.8 on Jun. 3, 3013; 6 pages.
Notice of Allowance issued in U.S. Appl. No. 13/314,808 on Oct. 12, 2012; 5 pages.
Communication under Rule 71(3) EPC issued in European Application No. 10184476.9 on Jul. 30, 2012; 36 pages.
Office Action issued in Japanese Application No. 2012-087239 on Oct. 16, 2013; 7 pages.
Notice of Allowance issued in Japanese Application No. 2012-185501 on Oct. 16, 2013; 3 pages—no translation.
Yue Zhang, et. al: "Future Transmitter/Receiver Diversity Schemes in Broadcast Wireless Networks", IEEE Communication Magazine, pp. 120-127, vol. 44, No. 10, Oct. 2006, XP002451396.

* cited by examiner

APPARATUS, AND ASSOCIATED METHOD, FOR PROVIDING OPEN LOOP DIVERSITY IN A RADIO COMMUNICATION SYSTEM

Matter enclosed in heavy brackets [ ] appears in the original patent but forms no part of this reissue specification; matter printed in italics indicates the additions made by reissue.

*CLAIM OF PRIORITY*

*This application is a continuation reissue application of reissue application Ser. No. 13/314,808, filed on Dec. 8, 2011, now U.S. Pat. No. Re. 44,021 and is a reissue of U.S. Pat. No. 7,860,465.*

The present invention relates generally to a manner by which to facilitate data communications in an open-loop MIMO (Multiple Input, Multiple Output) communication system, such as a cell-based OFDM (Orthogonal Frequency Division Mulitplexing), radio communication system. More particularly, the present invention relates to apparatus, and an associated method, by which to form multiple streams of the same data with the data symbols of each data stream phase-shifted, or otherwise altered to increase its diversity, relative to their counterparts in each other data stream. Each data stream, or a weighted combination thereof, forms an input into the MIMO communication system. The data is also provided to a plurality of radio base stations, formed, at each of the base stations, into multiple streams in the same manner to increase diversity, and then broadcast throughout a corresponding plurality of cells.

Phase-shifting of the data introduces diversity, provided without requiring closed-loop feedback. Open loop diversity provided by the phase-shifting of the data is particularly helpful to facilitate performance of a PTMP (Point to Multi-Point), i.e., broadcast, service.

BACKGROUND OF THE INVENTION

The network infrastructures of various types of radio communication systems have been installed over significant portions of the populated areas of the world. Cellular communication systems are exemplary of radio communication systems whose infrastructures are widely deployed and of which use is widespread. While cellular communication systems were primarily first utilized to perform voice communication services, increasingly, cellular communication systems are capable of more data-intensive communication services. Multimedia, and other data-intensive, communication services are increasingly performed by way of cellular, and cellular-like communication systems.

Cellular broadcast services are amongst the communication services that are performable, or proposed, for new-generation, cellular communication systems. A broadcast service is a PTMP (Point to Multi-Point) communication service in which data is broadcast by network infrastructure, available for reception by a plurality of mobile stations. The mobile stations are positionable at any location within the broadcast, i.e., coverage, area of the broadcast data. Communication conditions between a network broadcast node and individual ones of the mobile stations are non-ideal. Communication conditions upon the communication channels are additionally time-varying. Fading, and other, conditions interfere with the communication of the data.

Communication of data pursuant to other types of communication services, such as PTP (Point-to-Point) communication services also are susceptible to the same types of distortion. And, significant efforts have been made to provide manners by which to overcome, or compensate for, the effects of such distortion. Various closed-loop, feedback schemes are sometimes utilized. In a closed-loop scheme, a receiving station provides information to a sending station of communication channel conditions. And, in response thereto, the sending station elects in what manner to communicate the data best to overcome, or compensate for, the distortion. As communication conditions change, the closed-loop nature of the communication scheme permits the sending station again to change the manner by which the data is communicated, all responsive to the change in communication conditions. The power level at which the data is communicated as well as the modulation and encoding schemes by which the data is modulated and encoded are amongst the manners by which the sending station can make adaptation to the communication conditions.

Closed-loop schemes, however, are less amenable to broadcast, i.e., PTMP, communication services as the data is broadcast to a plurality of receiving stations. Each of the receiving stations, here mobile stations, is differently-positioned and likely to receive the broadcast data upon communication channels that exhibit different communication conditions.

In one existing PTMP scheme, a conservative modulation and coding scheme (MCS) is selected to ensure best that the broadcast data is communicated to the mobile stations in manners permitting the mobile stations to recover the information content of the broadcast data. Once the MCS is selected, the network alerts the mobile stations of the selected scheme. The signaling of the alert is, e.g., layer three signaling. In the event that the network becomes aware of communication conditions permitting of a change in the modulation in communication scheme, the scheme is accordingly changed. Use of the most-conservative MCS state, however, does not permit for increased throughput rates that might otherwise be possible if communication conditions are good and another MCS state were instead used.

In another existing proposal, on-demand selection is utilized. The network queries mobile stations for SINR (Signal-to-Noise Ratio) conditions of individual ones of the mobile stations to obtain channel conditions. And selection is made responsive thereto. Or, the network sends an alert identifying a selected MCS, and a mobile station is provided with an opportunity to reply with a "not agree" response if the selected MCS would be inappropriate for the mobile station, such as due to the communication conditions.

These existing schemes, as well as others, however, do not well provide for good optimization of the communication capabilities of the communication system.

Accordingly, an improved manner by which to provide for a PTMP service that better provides for compensation of non-ideal, communication channel conditions would therefore be beneficial.

It is in light of this background information that the significant improvements of the present invention have evolved.

DETAILED DESCRIPTION

Figure 1:
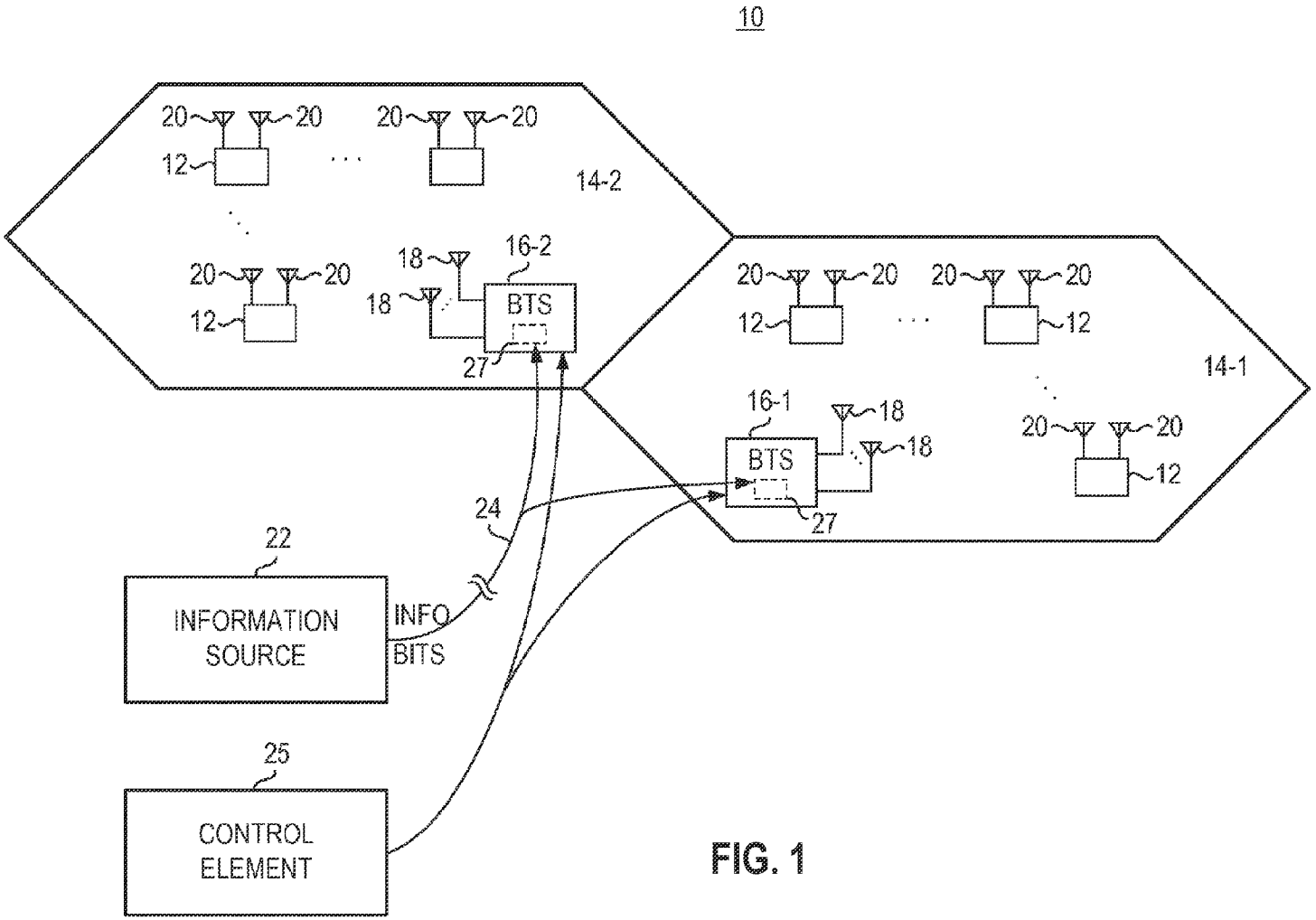
FIG. 1 illustrates a radio communication system in which an embodiment of the present invention is operable.

The present invention, accordingly, advantageously provides apparatus, and an associated method, by which to facilitate data communications in an open-loop, MIMO communication system, such as a cell-based, OFDM, radio communication system.

Through operation of an embodiment of the present invention, a manner is provided by which to form multiple data streams in which the data symbols of each data stream are operated upon, such as by phase-shifting or interleaving, to differ relative to their counterparts in each other data stream.

Through further operation of an embodiment of the present invention, the data is provided to a plurality of radio base stations, such as the radio base stations that define a group of neighbor cells. The data is formed, at each of the base stations, into multiple streams in the same manner to increase the diversity of the data. And, the multiple streams are communicated by each of the radio base stations throughout their respective cells.

In one aspect of the present invention, phase-shifting of the data introduces diversity, provided without requiring closed-loop feedback. When implemented in an OFDM, or other, radio communication system that provides a PTMP communication service, improved communications result.

In another aspect of the present invention, open-loop diversity that is provided by the phase-shifting of the data facilitates better reception of the communicated data at a mobile station, wheresoever positioned within the coverage area of the broadcast of the data.

In another aspect of the present invention, multiple data streams, including the same data, are provided. The identical, but phase-shifted, data streams are broadcast at transmit diversity antennas to provide thereby mobile stations positioned within detection range of such signal broadcasts. The mobile stations detect the communicated data streams at diversity receive antennas of the mobile stations. At the separate cells, the separate streams are communicated over the same resource elements. In an OFDM system, e.g., the data streams are broadcast on the same OFDM sub-carriers. The multiple data streams are selectably weighted, selectably combined, or not, and are applied to the transmit diversity antennas.

In another aspect of the present invention, the data symbols of the data streams provided to the different ones of the transmit diversity antennas are phase-shifted from one another. That is to say, a data symbol of a data stream provided at a first transmit diversity antenna is of a first phase, a corresponding data symbol of a data stream applied to a second transmit diversity antenna is offset in phase therefrom, i.e., the system information comprising the broadcast information comprises identification of the system inputs that broadcast the data $m^{th}$ diversity transmit antenna is phase shifted by another phase-shifted amount. That is, in this aspect, the separate data streams are not mixed together. Diversity is provided by way of the phase-shifting of the data symbols of the separate data streams. For m data streams, provided to m antennas, a progressive phase shifting of the corresponding data symbols of separate data streams is performed. When two data streams are provided for two separate transmit diversity antennas, the data streams are offset, for instance, by 90° from one another. A resultant matrix including the data symbols of the separate data streams thereby forms an orthonormal matrix. When greater numbers of data streams are provided, progressive offsets of 90° of the data symbols of the additional data streams are formed.

In another aspect of the present invention, the data symbols of the data streams, once phase-shifted, are selectably combined and selectably weighted, and then are provided to the transmit diversity antennas. That is to say, signals applied to a transmit antenna include components from more than one data stream. And, the signals applied to different transmit antennas are further selectably formed of different combinations, and weightings, of the data streams.

In another aspect of the present invention, the data streams that are provided are formed of encoded and modulated data symbols.

In another aspect of the present invention, the modulation symbols, once offset in phase from one another, such as by a multiple-input applier, are applied, either independently or in combined form, to spaced-apart diversity antennas of the base station. The broadcasts of the data streams at the separate broadcasting entities of the separate antennas introduces diversity into the transmitted data without necessitating closed loop communications.

In another aspect of the present invention, signaling is generated and sent to the mobile stations to alert the mobile stations of the phase shift parameters by which the data symbols are shifted in phase. The signaling comprises, for instance, layer three signaling. Signaling indicia further includes, for instance, other parameters, such as the number of data streams, the number of transmit antennas, etc.

In another aspect of the present invention, the same data is provided to a plurality of cells, viz., base stations positioned at, and defining different cells. Corresponding phase-shifting operations are performed at the separate cells. And, at the separate cells, the separate streams are communicated over corresponding resource elements. In an OFDM system, e.g., the data streams are broadcast on the same OFDM sub-carriers.

Thereby, an open loop diversity technique is provided by which to facilitate successful communication of a broadcast service in a cellular communication system, such as an OFDM-based multi-cell, communication system. Phase shifting of the data that is to be communicated provides the diversity that increases the likelihood that the informational content of the communicated data shall be recovered.

In these and other aspects, therefore, apparatus, and an associated method, is provided for communicating data formed of modulation symbols at multiple system inputs pursuant to an MIMO (multiple input multiple output) communication scheme. A symbol phase shifter is adapted to receive the modulation symbols of the data. The symbol phase shifter is configured selectably to phase-shift the modulation symbols. A multiple-input applier is configured to apply the modulated symbols, selectably offset in phase by the symbol phase shifter to the multiple system inputs.

Referring first, therefore, to FIG. 1, a radio communication system, shown generally at 10, provides for radio communications with mobile stations 12 of which a plurality of mobile stations are shown in the figure. The mobile stations are permitted movement, i.e., mobility. That is to say, at different times, the mobile stations are positionable at different locations, including different locations within the coverage area of the communication system. The area encompassed by the communication system includes a plurality of cells 14, each defined by a Base Transceiver Station (BTS) 16. In FIG. 1, a first base transceiver station 16-1 is associated with, and defines, a first cell 14-1, and a second base transceiver station 16-2 is associated with, and defines, a second cell 14-2. In an actual communication system, typically, a large number of cellular areas are defined, each associated with a base transceiver station. MIMO operation is provided with the base transceivers having spaced-apart, diversity transmit antennas 18 and with the mobile stations having spaced-apart, diversity receive antennas 20. Each of the transmit antennas defines a broadcast node.

In the exemplary implementation, the communication system comprises an OFDM (Orthogonal Frequency Division Multiplexing) communication system that defines sub-carriers upon which communication channels are defined. The sub-carriers are reused in different ones of the cells. Cellular communication systems constructed pursuant to other communication protocols are analogously represented. While the following description shall describe exemplary operation with respect to implementation of the communication system 10 as an OFDM system, the operation is analogous to, and representative of, other types of cellular, and other, communication systems.

The communication system is capable of performing Point to Multipoint (PTMP) communication services, i.e., broadcast services to a plurality of the mobile stations 12. In at least one proposed, OFDM-based system, the communication data broadcast pursuant to the performance of the broadcast service is to be broadcast concurrently throughout multiple cells, e.g., multiple neighbor cells. Through such broadcast in the multiple neighbor cells, inter-cell interference is reduced. The broadcasts in the separate cells are, e.g., carried out on the same resource elements, i.e., the same OFDM sub-carriers in the different cells. The broadcast service, an MBMS (Multimedia Broadcast Multicast Service) is an open loop scheme that does not utilize Adaptive Modulation and Coding (AMC). The communication data communicated as the multiple data streams in each cell are transported at identical information rates. Due to the open-loop nature of the communication scheme, closed-loop feedback is unavailable by which to select communication parameters of the communication data to facilitate best the broadcast of the data to the mobile stations.

The network infrastructure of the communication system is provided with information that is sourced at an information source 22. Information bits ("Info Bits") sourced at the information source are provided to the base stations 16-1 and 16-2 by way of the line 24. A control element 25 is also shown in FIG. 1. The control element controls various operations of the base stations 16 and provides various control signals thereto. The base stations operate in like manners and each include apparatus 27 of an embodiment of the present invention. The apparatus 27, as shall be described more fully below provides multiple data streams, each representative of the information bits, as multiple inputs that are broadcast in the cells 14. The data streams are formed in a manner that introduces diversity into the communicated data. Introduction of the diversity is provided in an open-loop manner, without the need of feedback from, the mobile stations 12.

Figure 2:
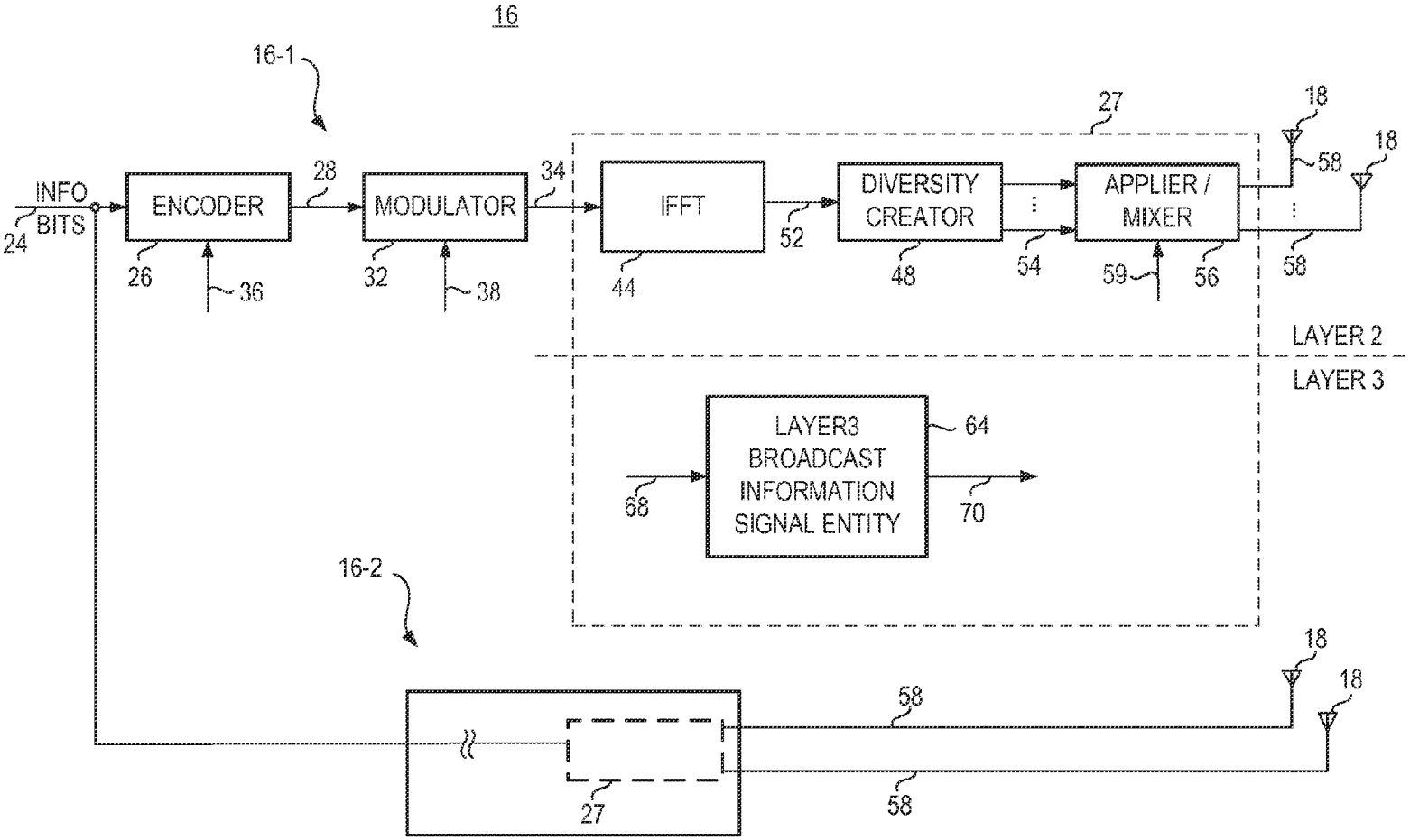
FIG. 2 illustrates a base transceiver station that forms part of the radio communication system shown in FIG. 1.

FIG. 2 illustrates a set of base stations, base stations 16-1 and 16-2, entities of base station 16, which each include the apparatus 27, in greater detail. Here again, the line 24 extends to each of the base stations. The functional elements of the base station 16-1 are shown. The functional elements of the base station 16-2 are similar. Here, the line 24 upon which the information bits are formed, extends to an encoder 26. The encoder operates to encode the received information bits and to generate coded bits on the line 28. The coded bits are provided to a modulator 32. The modulator 32 operates to modulate the encoded data bits provided thereto and to form modulated symbols on the line 34. Lines 36 and 38 extending to the encoder and modulator elements, respectively, are representative control inputs applied to the respective entities to control the coding and modulation operations performed at the respective elements.

The line 34 upon which the symbols are formed extends to the apparatus 27 of an embodiment of the present invention. The apparatus 27 is formed of functional entities, implementable in any desired manner, including, for instance, algorithms executable by processing circuitry, or firmware or hardware equivalents thereof. The apparatus here includes an IFFT (Inverse Fast Fourier Transformer) 44 that is coupled to the line 34 to be provided with the modulated symbols formed by the modulator 32. The apparatus further includes a diversity creator, here identified as a phase shifter. The diversity creator also splits the original stream into multiple streams for the MIMO transmission. In other implementations the diversity creator is implemented differently, such as interleaver analogously differently, such as an interleaver, analogously to create diversity. The phase shifter 48 is coupled to receive transformed symbols formed by the IFFT 44 on the line 52 and to provide phase-shifted values on the lines 54 to a multiple-input applier/mixer 56. Lines 58 extend between the applier/mixer 56 and individual transmit antennas 18. Here, lines 58 extend to two antennas 18. The line 59 is representative of control information provided to the applier/mixer to control its operation.

The apparatus further includes a layer-3 entity broadcast information entity 64 that generates, at the layer-3, broadcast information that is provided to a logical layer positioned therebeneath and communicated to the mobile stations. The broadcast information generated by the entity 64 provides information to mobile stations 12 that facilitate detection by the mobile stations of the communication data broadcast pursuant to the cellular broadcast service. The layer-3 entity represented as broadcast information entity is here provided with information related to phase shifting performed by the phase shifter 44 as well as other communication indicia, here indicated to be provided to the generator by way of the line 68 and the generated signaling is represented on the line 70. The information also includes the indicator that whether the cell is transmitted by MIMO manner for the MBMS.

In operation, the transformed symbols formed by the IFFT are provided to the phase shifter and the phase shifter forms multiple, identical data streams of the input sequence of modulated symbols. That is to say, the phase shifter also comprises the functionality of, or entities that form, a data stream splitter that forms multiple data-streams, here a first data-stream and a second data-stream. The phase shifter alters the phase of successive ones of the data streams to offset the phases of the data symbols of successive ones of the data streams. For instance, a first data stream, so-formed, is passed by the phase shifter without phase-shifting while the phase shifter shifts the data symbols of a second data stream by a first phase amount. Additional data streams have their data symbols shifted by other amounts so that the corresponding data symbols of each of the data streams generated on the lines 52 are offset in phase from one another. In the exemplary embodiment shown in FIG. 1, two data streams are formed, one for each diversity antenna. One of the data streams is passed without phase-shift, and the second of the data streams is offset in phase from the first data stream. Specifically, each data symbol of the data stream is offset by 90° relative to the corresponding data symbols of the un-shifted data stream. Introduction of the phase shift on the multiple data streams broadcast through the cell provides diversity to facilitate the recovery of the information content of the data when received by a mobile station. The applier routes, or otherwise causes application of the data-streams to the transmit antennas. Here, the applier forms a first data stream applier and a second data stream applier to apply the copies to the diversity antenna. The applier includes, for example, weighting elements and mixers. The weighting elements perform weighting operations, and the mixing elements perform mixing operations. The data streams, if desired, are mixed, or combined, in desired manners and applied, in mixed form to the antennas. Different combinations of mixed streams, if desired, are applied to the different antennas, The control element 25 (shown in FIG. 1), e.g., instructs the base stations regarding the phase, or other, diversity to be introduced upon the data streams.

Figure 3:
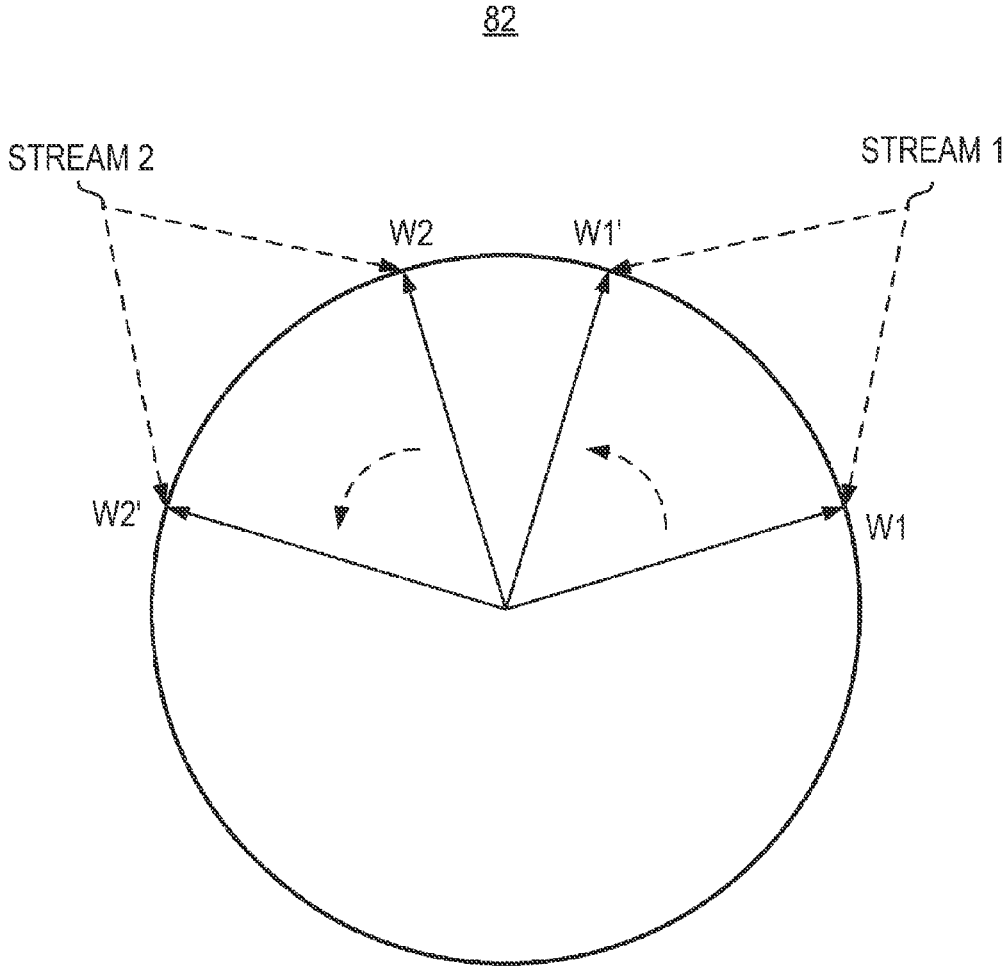
FIG. 3 illustrates a representation of an exemplary phase shift matrix W formed pursuant to operation of an embodiment of the present invention of data that is broadcast pursuant to a PTMP communication service.

Turning next to FIG. 3, a graphical representation, shown generally at 82, illustrates the phase offset introduced by operation of the phase shifter 48 of the apparatus 27 shown in FIG. 2. Here, two data symbols of a first data stream, stream 1, are represented in vector form. That is to say, vectors W1 and W1' are representative of a pair, here successive, data symbols of the first data stream. And, the vectors W2 and W2' are representative of the corresponding data symbols of a second data stream. The data symbol of the vector W2 corresponds to the data symbol of the vector W1. And, the data symbol W2' corresponds to the data symbol W1'. The respective vector orientations and rotations relative to one another indicates that the data symbols of the second data stream are rotated by 90° relative to the corresponding data symbols of the first data stream.

In the exemplary implementation, the phase rotations, i.e., shiftings, are preset, here preset at 90°, relative to one another. In this implementation, additional data streams, if used, are also shifted by additional 90° phase rotations. And, as review of the representation 82 indicates, the data symbols of the first stream are considered to be without any phase shift while the data symbols of the second stream are considered to be phase shifted by first of the progressive phase shifts, represented mathematically by $\Lambda_m(k)$ where k is the OFDM symbol index (over time), and m is the antenna index. A phase shift matrix W represents the data symbols of the data streams and, when the phase-shift is of 90° rotations, the matrix W is orthonormal. For the described, two-stream system, a phase shift of the two streams are, as shown, offset by 90°. And, specifically, the representation shown in FIG. 2 shows an M-PSTD concept with M=2.

The layer-3 entity, the broadcast information entity 64 (shown in FIG. 2), generates an information signal that identifies the amount of the phase shift. Here, the signal indicates a 90° phase shift. Additional information is provided, such as in the same information signal, to facilitate mobile station detection of the broadcast data and recovery of the informational content thereof. The additional information includes, e.g., parameters identifying the number of data streams, the number of transmit antennas from which the data is transduced, as well as other appropriate information. In the event that the geometry is not good for all of the cells, selection can further be made to not use MIMO techniques in the data communication. This information is also signaled to the mobile station, all to facilitate accurate RF combining of the communicated data in the multiple data streams. The information signal is communicated as layer 3 signaling in the exemplary implementation.

Figure 4:
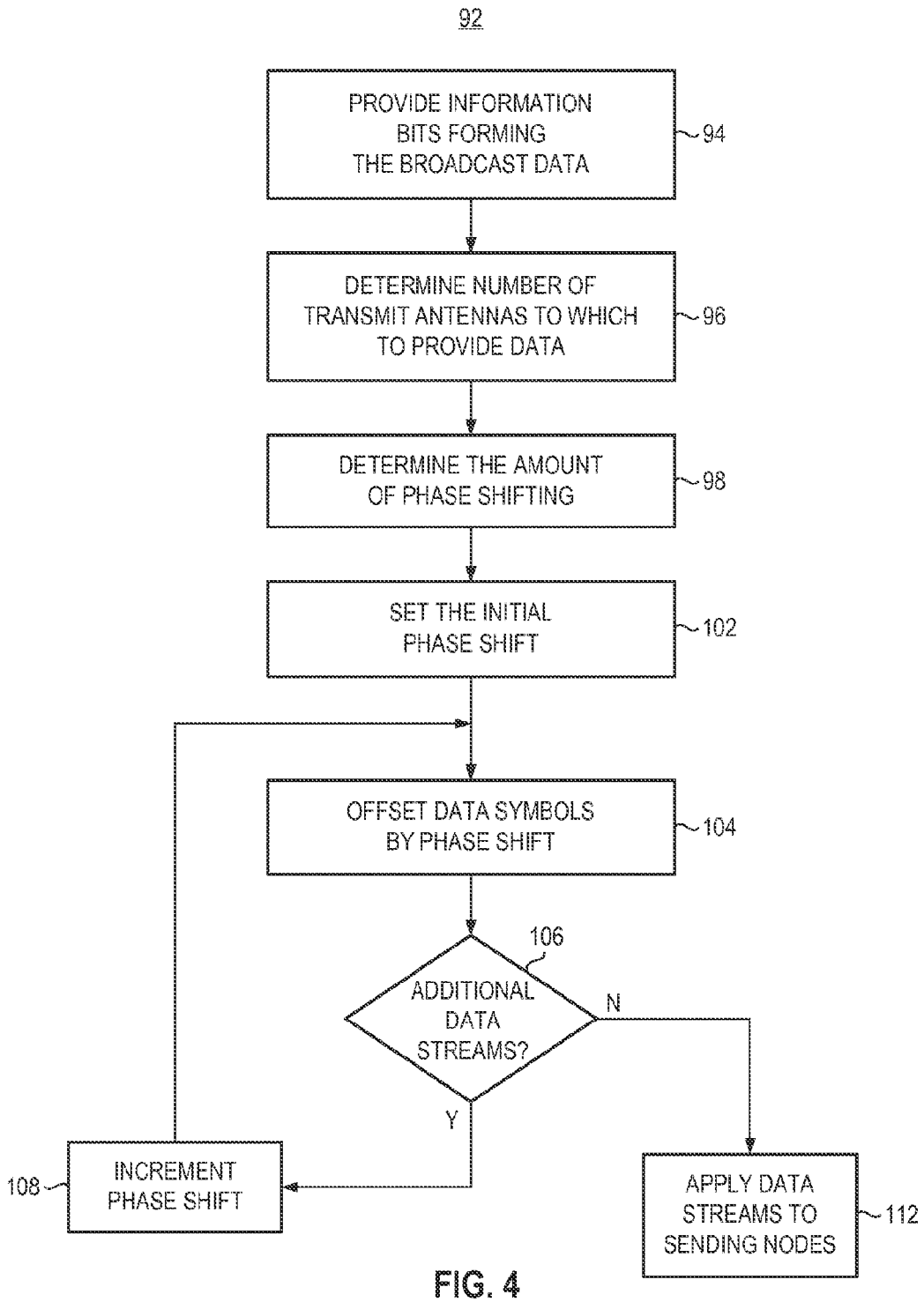
FIG. 4 illustrates a process diagram representative of the process of operation of an embodiment of the present invention.

FIG. 4 illustrates a process diagram, shown generally at 92, representative of the process of operation of an embodiment of the present invention. First, and as indicated by the block 94, information bits of the communication data that is to be broadcast pursuant to the broadcast communication service is provided. Then, and as indicated by the block 96, a determination is made as to how many transmit antennas to which data should be provided. The number of transmit antennas, in one implementation, a preset number. Then, and as indicated by the block 98, the amount of phase shifting is determined, and the initial phase shift is set as indicated by the block 102. Again, the amount of phase shifting, in one implementation is preset. Then, as indicated by the block 104, a first of the data streams is offset by the initial phase shift. In the exemplary implementation, the initial phase shift is 0°, and the first phase shift offset is also of 0°.

Then, a determination is made, as indicated by the decision block 106 as to whether additional data streams are to be sent. If so, the yes branch is taken to the block 108, the initial phase shift is incremented, and a path is taken back to the block 104, and the next data stream is phase shifted by the incremented phase shift amount, here 90°. Iterations are performed until the determination is made at the decision block 106 that there are no more data streams. The no branch is taken to the block 112, and the data streams are caused to be applied to the transmit diversity antennas 18, shown in FIG. 1. As noted previously, the data streams are selectably mixed and weighted prior to, or as part of the application to the antennas. When communicated to a mobile station, the data streams are detected by the receive antennas 20, forming the multiple outputs of the system. Circuitry of the mobile station recombines the detected data symbols at a recombiner, performs demodulation at a demodulator, and performs decoding at a decoder, all positioned in-line in a receive chain thereof.

Figure 5:
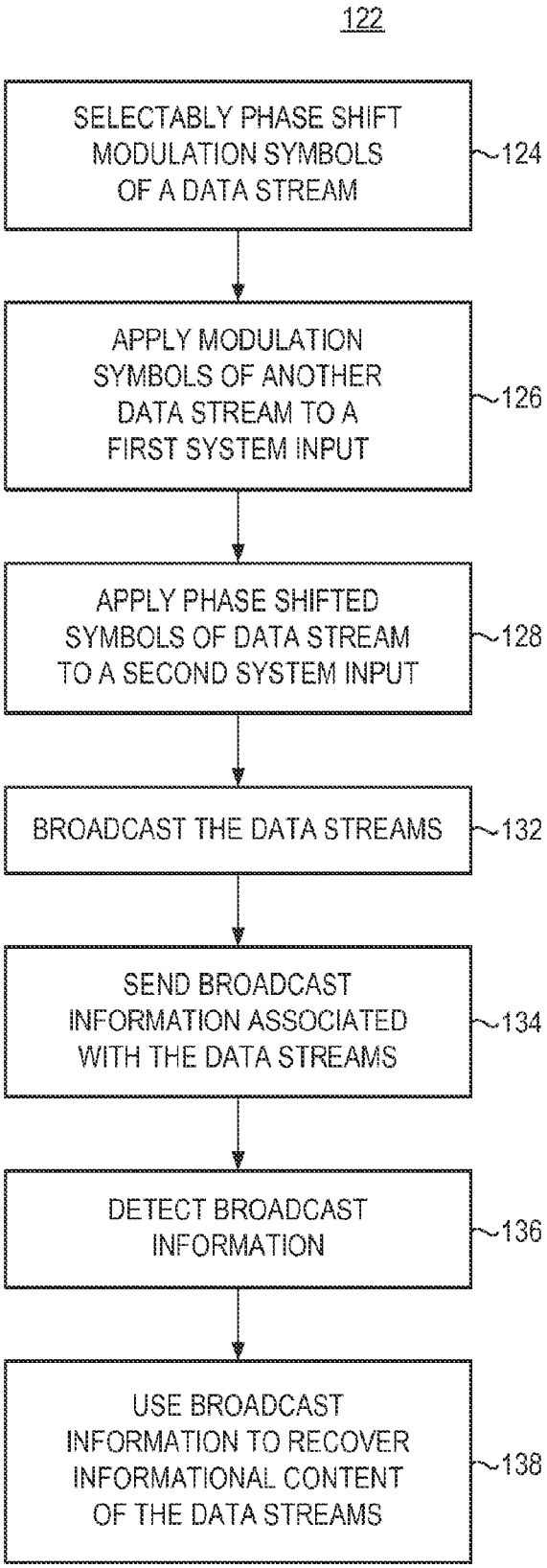
FIG. 5 illustrates a method flow diagram representative of the method of operation of an embodiment of the present invention.

FIG. 5 illustrates a method flow diagram, shown generally at 122, representative of the method of operation of an embodiment of the present invention. The method facilitates communication of data formed of modulation symbols at multiple system inputs pursuant to an MIMO communication scheme.

First, and as indicated by the block 124, modulation symbols of a selected data stream are selectably phase-shifted. Then, and as indicated by the block 126, the modulation symbols of another data stream are applied to a first system input of the multiple system inputs. The other data stream is formed of non-phase-shifted modulation symbols.

Then, and as indicated by the block 128, the phase-shifted symbols of the selected data stream are applied to a second system input of the multiple system inputs. And, as indicated by the block 132, the first data stream and the second data stream are broadcast, i.e., input into the system.

The method further includes sending broadcast information that identifies phase-shifting information related to the phase shifting as well as the MIMO capability information as indicated by the block 134. And, the method includes the operation, as indicated by the block 136, of detecting the broadcast information at a wireless device. And, as indicated by the block 138, the detected data streams are used to recover the informational content of the data.

Because of the phase shifting of the data symbols, diversity is introduced to facilitate recovery of the informational content of the broadcast data. And, the phase-shifting does not require unwieldy or bandwidth-consumptive closed-loop feedback information in a point to multipoint communication scheme.

What is claimed is:

[1. Apparatus for communicating data formed of a stream of symbols at multiple system inputs pursuant to a MIMO (Multiple Input Multiple Output) communication scheme, said apparatus communicating the stream of symbols throughout a first cell of a wireless communication system from first and second diversity antennas comprising:

a first symbol diversity creator disposed at a first cell and adapted to receive the stream of symbols, said first symbol diversity creator configured to split the stream of symbols into a first substream and a second substream, the first symbol diversity creator configured to alter the phase of the symbols of the second substream by a first phase amount resulting in a phase shifted second substream;

a first multiple-input applier configured to receive the first substream and the second substream and apply the first substream to at least the first diversity antenna and apply the second substream to at least the second diversity antenna; and a broadcast information generator configured to broadcast information identifying phase shifting information related to phase shifting of the symbols of the second substream.]

[2. The apparatus of claim 1 wherein said symbol diversity creator comprises a phase shifter, which shifts the phase of the second substream by substantially 90 degrees relative to the phase of the first substream.]

[3. The apparatus of claim 1 wherein said symbol diversity introducer is configured to introduce diversity, in a common manner, to the stream of symbols for application to each OFDM channel of a system input of the multiple system inputs.]

[4. The apparatus of claim 1 further comprising a transformer adapted to inverse Fourier transform the stream of symbols before the stream of symbols is received by the first symbol diversity creator.]

[5. The apparatus of claim 1 further comprising:

a second symbol diversity creator disposed at a second cell and adapted to receive the stream of symbols, said second diversity creator configured to split the stream of symbols into a third substream and a fourth substream, the second symbol diversity creator configured to alter the phase of the symbols of the fourth substream by the first phase amount, resulting in a phase shifted fourth substream;

a second multi-input applier configured to receive the third substream and the phase shifted fourth substream and apply the third substream to a third diversity antenna in the second cell and apply the phase shifted fourth substream to a fourth diversity antenna in the second cell; and wherein the phase shifted second substream and the phase shifted fourth substream are broadcast in a first manner and the first substream and the second substream are broadcast in a second manner.]

[6. The apparatus of claim 1 wherein the MIMO communication scheme further comprises an OFDM, Orthogonal Frequency Division Multiplexing, scheme that defines OFDM channels and wherein phase-shifting of the stream of symbols by said first symbol diversity creator comprises phase shifting symbols upon the OFDM channels.]

[7. The apparatus of claim 2 wherein said broadcast information generator is further adapted to receive indication of phase-shifting performed by said first symbol diversity creator.]

[8. The apparatus of claim 5 wherein the broadcast information generated by said broadcast information generator comprises information related to the first manner and the second manner.]

[9. The apparatus of claim 1 wherein said first multiple-input applier is further configured to combine said first substream and said second substream and apply said combined first and second substreams to said first and second diversity antennas.]

[10. The apparatus of claim 9 wherein said first multiple-input applier is further configured to apply weighting to said first substream and said second substream.]

[11. Apparatus for introducing transmission diversity in a data stream of symbols broadcast in an open loop PTMP, Point To Multipoint, service, by multiple broadcasting nodes having a plurality of diversity antennas, said apparatus comprising:

a first symbol diversity creator disposed at a first broadcasting node and adapted to receive the data stream of symbols, said first symbol diversity creator configured to split the data stream of symbols into a first substream and a second substream and configured to alter the phase of the data symbols of the second substream by a first phase amount resulting in a phase shifted second substream;

a first data-stream applier adapted to receive the first and second substreams, said first data stream applier configured to apply said first substream, in non-phase-shifted form, to at least a first diversity antenna at a first broadcasting node of the multiple broadcasting nodes and apply the second substream to at least a second diversity antenna at the first broadcasting node of the multiple broadcasting nodes;

a second symbol diversity creator disposed at a second broadcasting node and adapted to receive the data stream of symbols, said second diversity creator configured to split the data stream of symbols into a third substream and a fourth substream, the second symbol diversity creator configured to alter the phase of the symbols of the fourth substream by the first phase amount, resulting in a phase shifted fourth substream; and a second data-stream applier adapted to receive the third and fourth substreams, said second data-stream applier configured to apply the third substream to a third diversity antenna in the second broadcasting node and apply the phase-shifted fourth substream to a fourth diversity antenna in the second broadcasting node.]

[12. The apparatus of claim 11 wherein the first phase amount further comprises a phase shift of substantially 90 degrees.]

[13. The apparatus of claim 11 wherein said first datastream applier is further configured to combine said first substream and said second substream and apply said combined first and second substreams to said first and second diversity antennas.]

[14. The apparatus of claim 13 wherein said first datastream applier is further configured to apply weighting to said first substream and said second substream.]

[15. The apparatus of claim 11 further comprising a broadcast information generator configured to broadcast information identifying phase shifting information related to phase shifting of the symbols of at least the second substream.]

[16. The apparatus of claim 11 further comprising a transformer adapted to inverse Fourier transform the data stream of symbols before the data stream of symbols is received by the first symbol diversity creator.]

[17. A method for communicating data formed of a stream of symbols at multiple system inputs pursuant to a MIMO, Multiple Input Multiple Output, communication scheme, said method for communicating said stream of symbols throughout a first cell of a wireless communications system, from first and second diversity antennas at a first cell, said method comprising the operations of:

splitting the stream of symbols into a first substream and a second substream;

phase-shifting symbols of the second substream relative to the symbols of the first substream by a first phase amount;

applying symbols of the first substream to at least the first diversity antenna, the first data substream formed of non-phase-shifted symbols; and applying phase-shifted symbols of the second substream to at least the second diversity antenna; and sending broadcast information identifying phase-shifting information related to phase-shifting of the symbols of the second sub-stream.]

[18. The method of claim 17 further comprising the operation of transforming the stream of symbols with an inverse Fourier transform before the operation of splitting the stream of symbols.]

[19. The method of claim 17 further comprising the operations of combining said first substream and said second substream and applying said combined first and second substreams to said first and second diversity antennas.]

[20. The method of claim 17 further comprising the operation of detecting the broadcast information at a wireless device.]

[21. The method of claim 17 further comprising the operation of detecting, at a wireless device, at least one of the first substream and the second substream.]

[22. The method of claim 21 further comprising the operation of recovering, at the wireless device, informational content of the data.]

[23. The method of claim 17 further communicating said stream of symbols throughout a second cell from third and fourth diversity antennas, said method further comprising:

splitting the stream of symbols into a third substream and a fourth substream at the second cell;

phase shifting symbols of the fourth substream relative to the symbols of the third substream, the phase shift applied to the fourth substream being equal to the first phase amount;

applying symbols of the third substream at least to the third diversity antenna, the third substream formed of non-phase-shifted modulation symbols;

applying the phase-shifted symbols of the fourth substream at least to the fourth diversity antenna; and broadcasting the first substream and the third substream in a first manner and the second substream and the fourth substream in a second manner.]

[24. The method of claim 19 further comprising the operation of applying weighting to said first substream and said second substream.]

[25. The method of claim 17 wherein phase-shifting symbols of the second substream relative to the symbols of the first substream by a first phase amount further comprises phase-shifting by an amount substantially equal to 90 degrees.]

*26. A method for wirelessly communicating in a cell using a first and a second antenna port, comprising:*

*providing a first substream and a second substream;*

*phase-shifting symbols of the second substream relative to the symbols of the first substream by a first phase amount to generate complex-valued modulation symbols;*

*applying the symbols of the first substream to the first antenna port and the complex-valued modulation symbols of the second substream to the second antenna port;*

*generating a first time-domain OFDM signal for the first antenna port and a second time-domain OFDM signal for the second antenna port; and*

*sending information identifying the phase shift of the complex-valued modulation symbols.*

*27. The method of claim 26, wherein the first phase amount is approximately 90 degrees.*

*28. A computer program product encoded on a tangible, non-transitory storage medium, the product comprising computer readable instructions for causing one or more processors to perform operations comprising:*

*providing a first substream and a second substream;*

*phase-shifting symbols of the second substream relative to the symbols of the first substream by a first phase amount to generate complex-valued modulation symbols;*

*applying the symbols of the first substream to the first antenna port and the complex-valued modulation symbols of the second substream to the second antenna port; generating a first time-domain OFDM signal for the first antenna port and a second time-domain OFDM signal for the second antenna port; and*

*sending information identifying the phase shift of the complex-valued modulation symbols.*

*29. The computer program product of claim 28, wherein the first phase amount is approximately 90 degrees.*

*30. A base station, comprising: one or more processors configured to:*

*provide a first substream and a second substream;*

*phase-shift symbols of the second substream relative to the symbols of the first substream by a first phase amount to generate complex-valued modulation symbols;*

*apply the symbols of the first substream to the first antenna port and the complex-valued modulation symbols of the second substream to the second antenna port;*

*generate a first time-domain OFDM signal for the first antenna port and a second time-domain OFDM signal for the second antenna port; and*

*send information identifying the phase shift of the complex-valued modulation symbols.*

*31. The base station of claim 30, wherein the first phase amount is approximately 90 degrees.*

* * * * *

UNITED STATES PATENT AND TRADEMARK OFFICE

CERTIFICATE OF CORRECTION

PATENT NO. : RE44,666 E
APPLICATION NO. : 13/592192
DATED : December 24, 2013
INVENTOR(S) : Zhijun Cai It is certified that error appears in the above-identified patent and that said Letters Patent is hereby corrected as shown below:

On the Title Page, References Cited

On Page 2, In Column 1 (Other Publications), In Line 12, Delete "PEC" and insert -- EPC --, therefor.

On Page 2, In Column 2 (Other Publications), In Line 20, Delete "[omline]," and insert -- [online], --, therefor.

Signed and Sealed this
First Day of July, 2014

Michelle K. Lee

Michelle K. Lee
*Deputy Director of the United States Patent and Trademark Office*